United States Patent [19]
Nicollet et al.

[11] Patent Number: 5,704,092
[45] Date of Patent: Jan. 6, 1998

[54] REMOVABLE HANDLE FOR CONTAINERS

[75] Inventors: Eric Nicollet, Rumilly; Jean-Francois Brasset, Cran-Gevrier, both of France

[73] Assignee: SEB S.A., Ecully, France

[21] Appl. No.: 733,646

[22] Filed: Oct. 17, 1996

[30] Foreign Application Priority Data

Oct. 17, 1995 [FR] France ................ 95 12154
Jan. 26, 1996 [FR] France ................ 96 00947

[51] Int. Cl.$^6$ ........................................ A47J 45/00
[52] U.S. Cl. ................ 16/110 A; 220/759; 16/114 R
[58] Field of Search ........................... 16/110 A, 114 R, 16/DIG. 40, DIG. 41; 220/759, 769, 767, 768, 762

[56] References Cited

U.S. PATENT DOCUMENTS

| 1,453,543 | 5/1923 | Bonser . |
| 2,137,180 | 11/1938 | Porro . |
| 2,200,432 | 5/1940 | Reed . |
| 2,262,273 | 11/1941 | Ferrara ........................... 220/769 |
| 2,358,565 | 9/1944 | Dunlap ........................... 220/769 |
| 2,808,284 | 10/1957 | Rasmussen . |
| 3,059,809 | 10/1962 | Thompson ........................ 220/759 |

FOREIGN PATENT DOCUMENTS

| 6 344 473 | 6/1975 | Australia . |
| 1326544 | 8/1963 | France . |
| 1361405 | 8/1964 | France . |
| 2484820 | 12/1981 | France . |

*Primary Examiner*—Chuck Mah
*Attorney, Agent, or Firm*—Young & Thompson

[57] ABSTRACT

A handle designed for a container, in particular for a cooking vessel, having a side wall having a curved rim comprises two clamp members mounted on a holding body and having one end having a shape complementary to the interior and exterior surfaces of the curved rim of the container, respectively. The clamp members are moved relative to each other between an open position and a closed position in which the ends of the members clamp the curved rim and the side wall of the container.

8 Claims, 2 Drawing Sheets

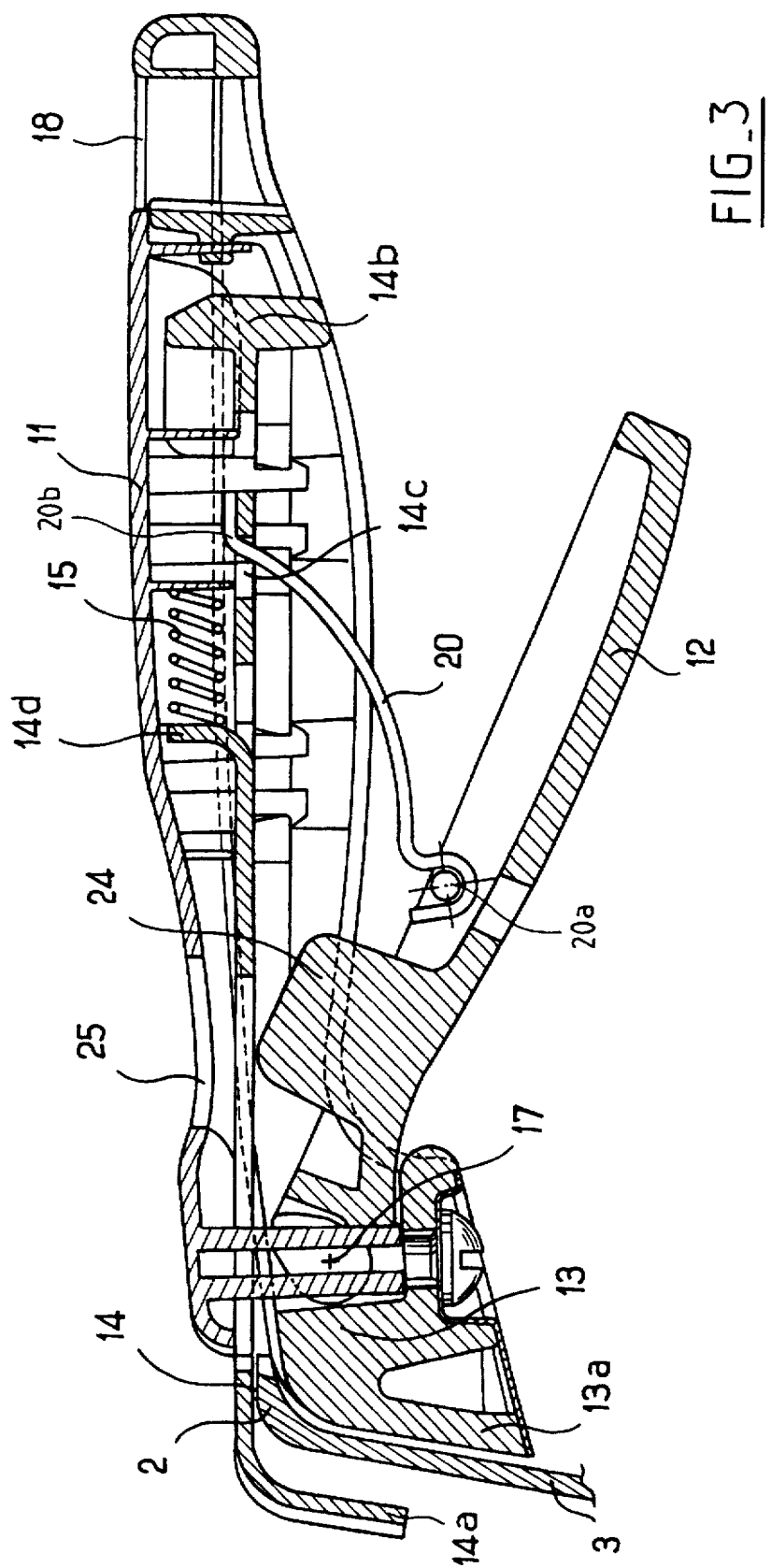

REMOVABLE HANDLE FOR CONTAINERS

BACKGROUND OF THE INVENTION

1. Field of the Invention

The present invention concerns a removable handle for containers, in particular for cooking vessels.

2. Description of the Prior Art

Casseroles and saucepans with removable handles are known in themselves. These vessels are provided with one or more male fixing members in the form of pins or in some other form on their external wall, the equipment having a female shape at its end that can be easily inserted into and withdrawn from the fixing member.

This type of equipment consequently requires the containers to be pre-equipped with a fixing member, which is welded or riveted on, for example, which complicates their manufacture.

This external member is also a nuisance when it comes to stacking different vessels.

A handle described in U.S. Pat. No. 2,808,284 comprises two jaws adapted to grip the edge of a container.

However, the mobile jaw pivots on guide rods, which leads to somewhat inaccurate location of the jaws on the skirt of the container.

In addition, the pivoting of the mobile member is matched to only one thickness of container skirt, and the jaws are not parallel in the closed position of the handle for other thicknesses of container.

The present invention proposes to remove the aforementioned drawbacks by a removable handle that requires no pre-equipment of the containers, that also simplifies the handling of the containers and that can be fitted to containers of different thicknesses.

The handle of the invention is removable and is designed for a container, in particular a cooking vessel, that has a side wall or skirt having a curved rim.

SUMMARY OF THE INVENTION

The handle of the invention comprises two clamp members mounted on a holding body and having one end of complementary shape to the interior and exterior surfaces of a part of the skirt and of the curved rim of the container, respectively, and displacement means adapted to displace said members relative to each other between an open position and a closed position in which the ends of the members grip the skirt of the container, one of the members being mobile in translation relative to the holding body, the displacement means comprising a lever mounted on the holding body to pivot between a spread position and a position retracted inside the holding body and a leaf spring forming a link extending between the lever and the mobile member being adapted to displace the mobile member in translation when the lever pivots.

Accordingly, the container can be grasped using the handle simply by gripping the skirt of the container. The curved rim provides an abutment for the clamp members and vertical sliding is prevented. The handle therefore provides a very safe way of grasping and moving the container.

Moreover, this handle does not require appropriate additional parts to be fixed to the containers.

Furthermore, the container can be grasped at any point on the rim of the container. There is therefore no need to turn the container on itself to orient it at a predetermined angle before grasping it.

The handle can be fitted to any container with a pouring rim, regardless of its diameter or shape. Furthermore, the handle is securely fixed regardless of the thickness of the skirt of the container, the ends of the clamp members mating with the exterior and interior surfaces of the skirt.

The fact that the handle can be removed from the container is a safety feature by removing the risk of snagging the containers when in use, which can accidentally overturn the container, facilitates storage in cupboards and in the racks of dishwashers, and provides a way of placing the articles in the oven.

In a preferred embodiment of the invention the device includes locking means adapted to maintain the members in a closed position with respect to each other.

By virtue of these locking means the handle may remain attached to the container for as long as the user requires.

In an advantageous version of the invention the other member is fixed relative to the holding body.

This structure facilitates positioning of the handle on the curved rim of the container. The fixed member is placed in contact with the skirt of the container, and then the displacement means are actuated to grip the skirt. This fixes the handle to the container in a precise manner.

Other features and advantages of the invention will emerge from the following description.

BRIEF DESCRIPTION OF THE DRAWINGS

In the accompanying drawings, given by way of non-limiting example:

FIG. 3 is a view in section of a second embodiment of a handle of the invention shown in the open position.

DETAILED DESCRIPTION OF THE PREFERRED EMBODIMENTS

Figure 1:
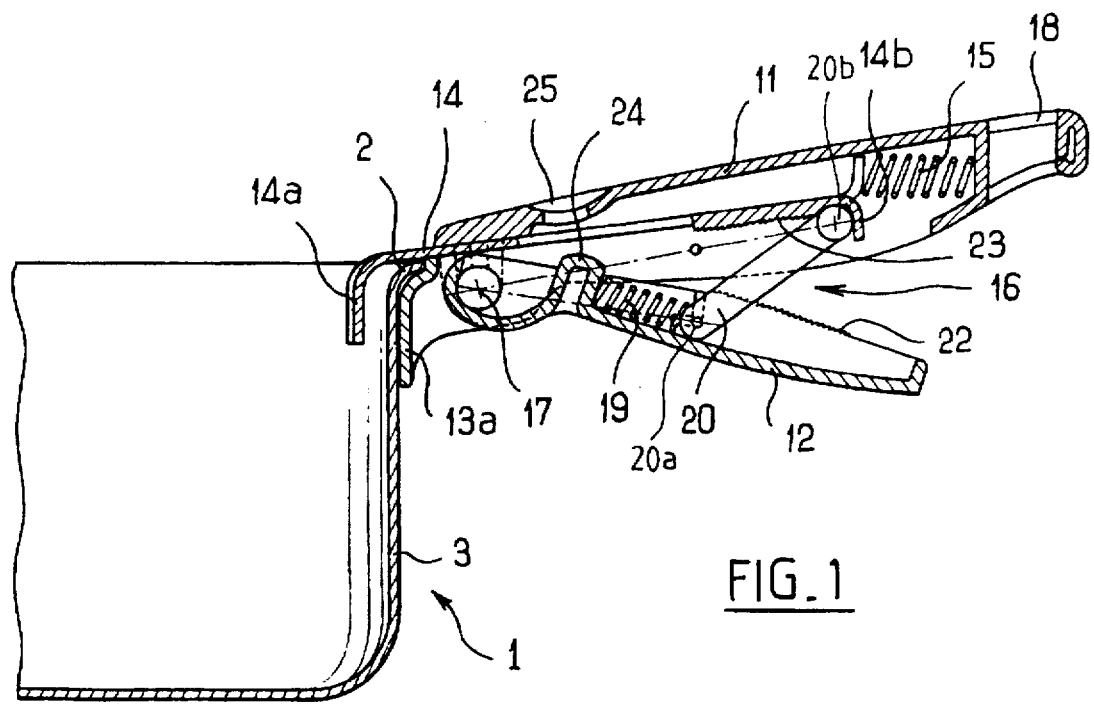
FIG. 1 is a view in section of a first embodiment of a handle of the invention shown in the open position.

A first embodiment of the invention will be described first with reference to FIGS. 1 and 2.

The handle of the invention is designed for a container 1 of the cooking vessel type (saucepan, casserole, oven dish, etc), generally having a bottom and a side wall or skirt 3 with a curved rim 2 that forms a pouring lip.

The handle comprises two members 13 and 14 forming a clamp mounted on a holding body 11. In this embodiment the clamp is the shape of a saucepan handle with an opening 18 at the rear enabling it to be suspended from a hook. The handle could also be in the shape of a removable casserole handle.

The members 13 and 14 have ends 13a and 14a with a shape complementary to the exterior or the interior surface of the curved rim and a part of the skirt adjacent the rim 2, respectively.

In this example the end 13a of the member 13 mates with the exterior surface of the skirt and the end 14a of the member 14 mates with the interior surface of the skirt.

Figure 2:
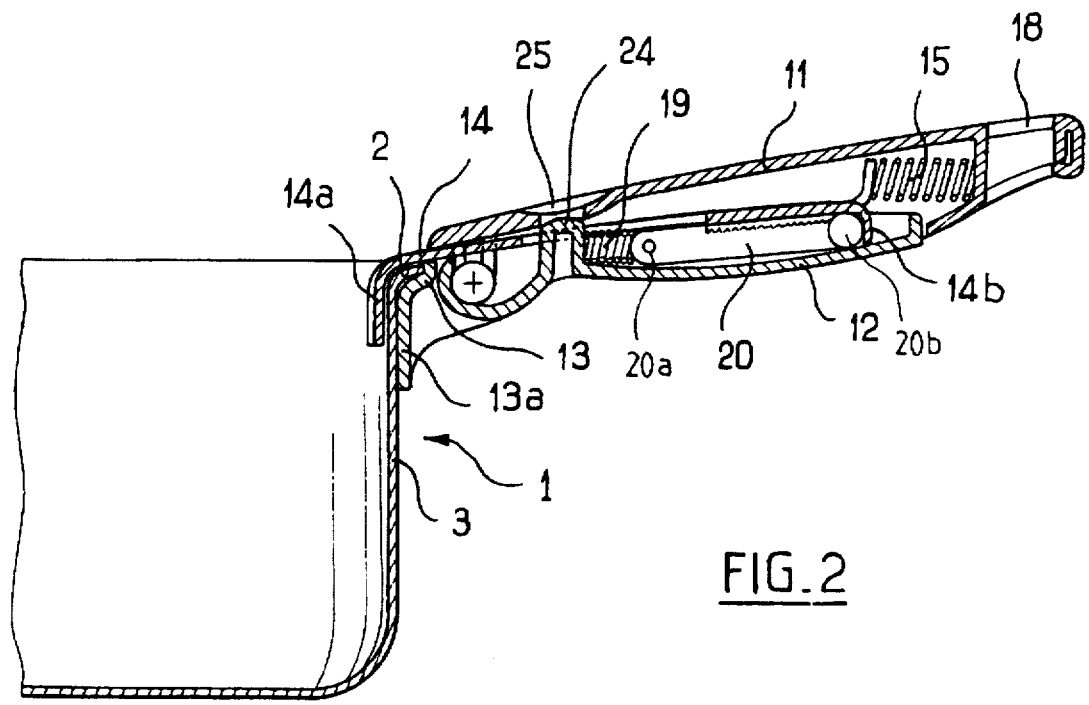
FIG. 2 shows the handle from FIG. 1 in a closed position.

Displacement means 12 are adapted to displace the members 13 and 14 relative to each other between an open position shown in FIG. 1 and a closed position shown in FIG. 2 in which the ends 13a and 14a grip the skirt 3 of the container 1.

The displacement means comprise a lever 12 pivoting on the holding body 11 between a spread position and a position retracted into the holding body 11.

The latter includes a housing adapted to receive the lever in the retracted position, corresponding to the closed position of the clamping members 13 and 14.

Accordingly, when the handle is fixed to the container 1 it has substantially the same exterior shape as a conventional saucepan handle.

The lever 12 pivots about a pivot pin 17 on the holding body 11.

Locking means 16 described below are adapted to hold the members 13 and 14 in the closed position relative to each other.

One of the members 14 is mobile in translation relative to the holding body 11.

The ends 13a, 14a remain parallel to each other upon closing the handle and substantially parallel to the skirt 3 of the container 1.

The handle of the invention can therefore be fitted to a container of any thickness within the maximal travel in translation of the mobile member 14.

The other member 13 is fixed relative to the holding body 11 and mates with the exterior surface of the lip 2 of the container 1.

To facilitate manipulation by the user and to obtain the most ergonomic design, the lever 12 for actuating the handle is fixed to the underside of the holding body 11.

In accordance with the invention the member 14 is mobile in translation relative to the holding body 11 and a link 20 extends between the lever 12 and the member 14 and is adapted to displace the member 14 in translation when the lever 12 pivots.

Accordingly, when the lever 12 pivots about the pivot pin 17 attached to the holding body 11 the end 20a of the link 20 inserted into the lever 12 also pivots so that at the end of the travel of the lever the link 20 is aligned with the translation axis of the member 14, i.e. the longitudinal axis of the holding body 11.

The mobile member 14 has an end 14b on which the other end 20b of the link 20 bears.

In this example, a compensator spring 19 is fixed to the lever at one end and to the end 20a of the link 20 inserted into the lever 2 at the other end.

In the closed position shown in FIG. 2 the compensator spring 19 applies a force in the direction away from the container 1 to the end 14b of the member 14 through the intermediary of the link 20 and so enables adjustment of the separation between the two members 13 and 14 according to the thickness of the container 1 and the diameter. This eliminates any play where the lip 2 is gripped by the members 13 and 14. The link 20 and the spring 19 therefore form locking means 16 adapted to hold the members 13 and 14 in the closed position relative to each other.

In the closed position, at least one portion of the member 14 mobile in translation and at least one portion of the lever 12 are preferably adjacent to each other, these portions including complementary racks 22, 23 adapted to mesh with each other and to immobilize the member 14.

The rack system thus provides a safety device to guard against a defective compensator spring 19 that no longer exerts sufficient force to hold the members 13 and 14 clamped against the curved rim 2.

A release button 24 is provided on the pivoting lever 12.

The holding body 11 includes an opening 25 disposed so that in the closed position the release button 24 is accommodated in the opening 25 and therefore passes through the holding body 11.

To release the handle the user depresses the button 24 with their finger.

The compensator spring 19 and the link 20 are then no longer aligned in the direction of translation of the mobile member 14, a return spring 15 disposed between the holding body 11 and the end of the mobile member 14 being adapted to exert a force in the opposite direction to that of the compensator spring 19 on the member 14 so as to separate the two clamp members 13, 14.

To release the handle it is therefore necessary to depress the release button 24 and at the same time to let go of the holding body 11 of the handle in order to enable the members 13, 14 to separate.

The removable handle is therefore extremely safe to use since it cannot open if the user is gripping the holding body, in particular when the container is being moved, even if the release button should be depressed accidentally.

The operation of the handle of the invention obliges the user requiring to remove the handle to put the container down in a stable position first, in order to release the pressure of the fingers on the holding body to allow the clamp members 13, 14 to separate.

A second embodiment of the invention is shown in FIG. 3. Components common to the previous example and identified by the same reference numbers are not described again below.

In this embodiment the combination of the link 20 and the compensator spring 19 is replaced by a leaf spring 20 that also functions as a link. As previously, the leaf spring 20 has one end 20a mounted in the lever 12 so that it pivots with the latter when the handle is opened and closed.

The other end 20b of the leaf spring 20 no longer bears on the end 14b of the member mobile in translation but instead engages with the member 14, through an opening 14c formed in the length of the mobile member 14. The link leaf spring 20 therefore extends between the lever 12 and the member 14 and is adapted to displace the latter in translation when the lever pivots.

The distance between the end 14a bearing on the rim 2 of the container 1 and the opening 14c is such that the handle can grip the lip of the smallest diameter and thinnest containers available.

The leaf spring 20 is by design sufficiently elastic to be slightly compressed when the handle is closed to adjust the separation between the two members 13 and 14 to compensate for the different diameters and the different thicknesses of cooking vessels.

The leaf spring 20 therefore has a curved profile between its respective ends mounted on the mobile member 14 and the lever 12, the radius of curvature of this profile being slightly reduced when the leaf spring is compressed.

In the closed position of the handle the leaf spring 20 is parallel to the axis of translation of the mobile member 14, i.e. perpendicular to the portion of the skirt 3 of the container 1 receiving the handle, and is adapted to exert a force on the end 14a of the mobile member 14 and to exert an equal and opposite force on the end 13a of the other member 13. The link leaf spring 20 therefore exercises the function of the compensator spring 19 from the previous embodiment.

As previously, the mobile member 14 has a portion 14d forming a bearing surface for a return spring 15 disposed between this bearing surface 14d and a portion attached to the body 11 of the handle.

Of course, many modifications may be made to the above example without departing from the scope of the invention.

For example, the handle could have a holding body in the shape of a casserole handle.

There is claimed:

1. A removable handle for a container, the container having a skirt, said handle comprising:

a mobile and a stationary clamp member mounted on a holding body, said mobile and stationary clamp members having a respective end of complementary shape to the interior and exterior surface of a part of the skirt, respectively; and displacement means for displacing said clamp members relative to each other between an open position and a closed position in which the respective end of each clamp member clamps the skirt, said displacement means comprising a lever mounted on said holding body to pivot between a spread position and a retracted position inside said holding body, and a spring means mounted on said lever for exerting a force on the end of said mobile clamp for translating said mobile member relative to said holding body member and for exerting an opposite force on the end of said stationary clamp member sufficient to hold said clamp members in the closed position.

2. The handle claimed in claim 1, wherein said spring means comprises a compensator spring and a link, said compensator spring extending between the lever and a link parallel to an axis of translation of said mobile clamp member in the closed position.

3. The handle claimed in claim 1, wherein said lever is in the retracted position when said clamp members are in the closed position, said spring means including a leaf spring extending in the closed position parallel to an axis of translation of said mobile clamp member.

4. A removable handle for a container, the container having a skirt with a curved rim, said handle comprising:

a mobile and a stationary clamp member mounted on a holding body, said mobile and stationary clamp members having a respective end of complementary shape to an interior and an exterior surface of a part of the skirt and of the curved rim of the skirt, respectively; and displacement means for displacing said clamp members relative to each other between an open position and a closed position in which said respective ends of said clamp members clamp the skirt of the container;

said displacement means comprising a lever mounted on said holding body to pivot between a spread position and a retracted position inside said holding body and a leaf spring extending between said lever and said member for translating said mobile member relative to the holding body when said lever pivots to eliminate play between said clamping members and the rim.

5. A handle as claimed in claim 4 further comprising locking means for holding said members in a closed position relative to each other.

6. The handle claimed in claim 4 wherein said other member is fixed relative to said holding body.

7. The handle claimed in claim 4 wherein said lever is fixed to the underside of said holding body.

8. The handle claimed in claim 4, wherein at least one portion of said mobile member and one portion of said lever are adjacent to each other in said closed position, said at least one portion of said mobile member and said portion of said lever incorporating complementary racks to mesh with each other and to immobilize said mobile member.

* * * * *